(12) United States Patent
Bae et al.

(10) Patent No.: US 8,936,879 B2
(45) Date of Patent: Jan. 20, 2015

(54) COMPOSITE CATHODE ACTIVE MATERIAL, CATHODE AND LITHIUM BATTERY CONTAINING THE MATERIAL AND METHOD OF PREPARING THE SAME

(71) Applicant: Samsung SDI Co., Ltd., Yongin-si (KR)

(72) Inventors: Myung-Hun Bae, Yongin-si (KR); Naoyuki Hase, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 122 days.

(21) Appl. No.: 13/801,838

(22) Filed: Mar. 13, 2013

(65) Prior Publication Data

US 2014/0057163 A1   Feb. 27, 2014

(30) Foreign Application Priority Data

Aug. 22, 2012 (KR) .................. 10-2012-0091987

(51) Int. Cl.
*H01M 2/16* (2006.01)
*H01M 4/485* (2010.01)
*H01M 10/42* (2006.01)
*H01M 4/02* (2006.01)

(52) U.S. Cl.
CPC ...... *H01M 4/485* (2013.01); *H01M 2010/4292* (2013.01); *H01M 10/4235* (2013.01); *H01M 2004/028* (2013.01); *Y02E 60/122* (2013.01); *Y02T 10/7011* (2013.01)
USPC ... 429/248; 429/209; 429/218.1; 429/231.95; 429/251

(58) Field of Classification Search
CPC .... H01M 4/00; H01M 10/00; H01M 2400/00
USPC .................. 429/209, 218.3, 231.95, 248, 251
See application file for complete search history.

(56) References Cited

U.S. PATENT DOCUMENTS 7,964,309 B2   6/2011  Kuwahara et al.

FOREIGN PATENT DOCUMENTS

| KR | 1020060082971 | * 8/2006 | ............. H01M 4/48 |
|----|---------------|----------|------------------------|
| KR | 10-2007-0109878 | 11/2007 | |
| KR | 10-2008-0020087 | 3/2008 | |
| KR | 10-2008-0096371 | 10/2008 | |
| KR | 10-2010-0109605 | 10/2010 | |

* cited by examiner

*Primary Examiner* — Patrick Ryan
*Assistant Examiner* — Ben Lewis
(74) *Attorney, Agent, or Firm* — Christie, Parker & Hale, LLP (57) ABSTRACT

A composite cathode active material, a cathode including the composite cathode active material, and a lithium battery including the cathode. The composite cathode active material includes: a lithium transition metal oxide; and a lithium-containing impurity on a surface of the lithium transition metal oxide. The lithium-containing impurity includes free lithium in an amount of about 0.050 wt % or less based on a total weight of the composite cathode active material, and LiOH and $Li_2CO_3$ in a mole ratio of LiOH to $Li_2CO_3$ of about 0.50 or less.

20 Claims, 2 Drawing Sheets

COMPOSITE CATHODE ACTIVE MATERIAL, CATHODE AND LITHIUM BATTERY CONTAINING THE MATERIAL AND METHOD OF PREPARING THE SAME

CROSS-REFERENCE TO RELATED APPLICATION

This application claims priority to and the benefit of Korean Patent Application No. 10-2012-0091987, filed on Aug. 22, 2012, in the Korean Intellectual Property Office, the disclosure of which is incorporated herein in its entirety by reference.

BACKGROUND

1. Field

The following description relates to a cathode active material, a cathode and a lithium battery each including the cathode active material, and a method of preparing the cathode active material.

2. Description of the Related Art

Transition metal compounds, such as $LiNiO_2$, $LiCoO_2$, $LiMn_2O_4$, $LiFePO_4$, $LiNi_xCo_{1-x}O_2$ ($0 \leq x \leq 1$), and $LiNi_{1-x-y}Co_xMn_yO_2$ ($0 \leq x \leq 0.5$, $0 \leq y \leq 0.5$), and lithium oxides of these transition metal compounds are widely used as cathode active materials for lithium batteries.

Such a cathode active material is mixed with a binder, a conducting agent, or the like to obtain a cathode active material slurry, which is then coated on a substrate to form a cathode active material layer, thereby manufacturing a cathode.

A surface state of the cathode active material layer depends on the state of the cathode active material which makes up about 70 to 90 wt % of the cathode active material slurry.

When the surface state of the cathode active material layer is poor due to the presence of protrusions or cracks thereon, an additional process for removing them is required for manufacturing a battery or even worse—a cathode having such a poor cathode active material layer may not even be suitable to be used for manufacturing a battery. Furthermore, a battery including a cathode with such a cathode active material layer having poor surface characteristics may cause reduced performance.

Therefore, there is a need for a method of removing protrusions from a cathode active material layer surface.

SUMMARY

An aspect of an embodiment of the present invention is directed toward a composite cathode active material with low impurity content.

An aspect of an embodiment of the present invention is directed toward a cathode including the composite cathode active material.

An aspect of an embodiment of the present invention is directed toward a lithium battery employing the cathode.

An aspect of an embodiment of the present invention is directed toward a method of preparing the composite cathode active material.

Additional aspects will be set forth, in part, in the description which follows and, in part, will be apparent from the description, or may be learned by practice of the presented embodiments.

According to one or more embodiments of the present invention, a composite cathode active material includes: a lithium transition metal oxide; and a lithium-containing impurity on a surface of the lithium transition metal oxide, wherein the lithium-containing impurity includes free lithium in an amount of about 0.050 wt % or less based on a total weight of the composite cathode active material, and the lithium-containing impurity includes LiOH and $Li_2CO_3$, and a mole ratio of LiOH to $Li_2CO_3$ is about 0.50 or less.

According to one or more embodiments of the present invention, a cathode includes the above-described composite cathode active material.

According to one or more embodiments of the present invention, a lithium battery includes the above-described cathode.

According to one or more embodiments of the present invention, a method of preparing a composite cathode active material includes: mixing precursors of a lithium transition metal oxide together to prepare a mixture; and calcining the mixture in an oxygen atmosphere at a temperature of about 950° C. or higher to obtain a calcined product.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in more detail to embodiments of the present disclosure, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of a composite cathode active material, a cathode including the composite cathode active material, and a lithium battery including the cathode will be described in more detail.

One or more embodiments of the present invention include a composite cathode active material. The composite active material includes: a lithium transition metal oxide and a lithium-containing impurity on a surface of the lithium transition metal oxide. Here, the lithium-containing impurity includes free lithium in an amount of about 0.050 wt % or less based on a total weight of the composite cathode active material. The lithium-containing impurity includes LiOH and $Li_2CO_3$ in a mole ratio of LiOH to $Li_2CO_3$ of about 0.50 or less.

Since the composite cathode active material includes such a low-lithium containing impurity, a reduced number of protrusions may be formed on a surface of a cathode active material layer prepared using the composite cathode active material. By using a cathode including the cathode active material layer with reduced protrusions, a lithium battery may have improved cycle characteristics.

In some embodiments, the amount of free lithium in the composite cathode active material is greater than 0 wt % and about 0.045 wt % or less based on the total weight of the composite cathode active material, and in other embodiments, is greater than 0 wt % and about 0.040 wt % or less. The lower the amount of free lithium, the less protrusions may be formed on the surface of the cathode active material layer.

An amount of free lithium is defined as a lithium content calculated based on an amount of impurities obtained via titration of a solution of the composite cathode active material dissolved in a solvent with an acid. That is, the amount of free lithium is a lithium content not included in the lithium transition metal oxide.

In some embodiments, a mole ratio of LiOH to $Li_2CO_3$ in the composite cathode active material ($LiOH/Li_2CO_3$) is about 0.480 or less, and in some other embodiments, is greater than 0 and about 0.470 or less. The lower the mole ratio of $LiOH/Li_2CO_3$, the less protrusions may be formed on the surface of the cathode active material layer.

An amount of LiOH in the composite cathode active material may be less than about 0.07 wt % based on the total weight of the composite cathode active material, and in some embodiments, is greater than 0 wt % and about 0.065 wt % or less based on the total weight of the composite cathode active material. The lower the amount of LiOH, the less protrusions may be formed on the surface of the cathode active material layer.

The lithium transition metal oxide of the composite cathode active material may include at least one compound selected from the group of compounds represented by Formulae 1 to 5:

$$Li_xCo_{1-y}M_yO_{2-\alpha}X_\alpha \qquad \text{<Formula 1>}$$

$$Li_xCO_{1-y-z}Ni_yM_zO_{2-\alpha}X_\alpha \qquad \text{<Formula 2>}$$

$$Li_xMn_{2-y}M_yO_{4-\alpha}X_\alpha \qquad \text{<Formula 3>}$$

$$Li_xCo_{2-y}M_yO_{4-\alpha}X_\alpha \qquad \text{<Formula 4>}$$

$$Li_xMe_yM_zPO_{4\alpha}X_\alpha \qquad \text{<Formula 5>}$$

wherein, in Formulae 1 to 5, $0.90 \leq x \leq 1.1$, $0 \leq y \leq 0.99$, $0 \leq z \leq 0.5$, $1-y-z>0$, and $0 \leq \alpha \leq 2$, Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); M is at least one element selected from the group consisting of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), nickel (Ni), manganese (Mn), chromium (Cr), iron (Fe), vanadium (V), and a rare earth element; and X is an element selected from the group consisting of oxygen (O), fluorine (F), sulfur (S), and phosphorous (P).

In some embodiments, in the lithium transition metal oxides of Formulae 1 to 5 above, the value y may be satisfied with $0.4 \leq y \leq 0.99$.

In some embodiments, the lithium transition metal oxide of the composite cathode active material may be a compound represented by Formula 6 below:

$$Li[Li_xMe_y]O_{2+d} \qquad \text{<Formula 6>}$$

wherein, in Formula 6 above, $x+y=1$, $0 \leq x<1$, and $0 \leq d \leq 0.1$, and Me is at least one metal selected form the group consisting of manganese (Mn), vanadium (V), chromium (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

For example, the lithium transition metal oxide of the composite cathode active material may be a compound represented by Formula 7 below:

$$Li[Li_xNi_aCo_bMn_c]O_{2+d} \qquad \text{<Formula 7>}$$

In Formula 7, $x+a+b+c=1$; $0 \leq x<1$, $0.4 \leq a<1$, $0<b<1$, $0<c<1$, and $0 \leq d \leq 0.1$.

For example, the lithium transition metal oxide of the composite cathode active material may be a compound represented by Formula 8 below:

$$(p)Li_2MO_3\text{-}(1\text{-}p)LiMeO_2 \qquad \text{<Formula 8>}$$

In Formula 8, $0<p<1$; M is at least one element selected from the group consisting of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), nickel (Ni), manganese (Mn), chromium (Cr), iron (Fe), vanadium (V), and a rare earth element; and Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B).

For example, the lithium transition metal oxide of the composite cathode active material may be a compound represented by Formula 9 below:

$$(p)Li_2MnO_3\text{-}(1\text{-}p)LiNi_aCo_bMn_cO_2 \qquad \text{Formula 9}$$

In Formula 9, $0<p<1$, $0<a<1$, $0<b<1$, $0<c<1$, and $a+b+c=1$.

One or more embodiments of the present invention include a cathode including the composite cathode active material.

The cathode may be manufactured as follows.

First, the above-described composite cathode active material, a conducting agent, a binder, and a solvent are mixed to prepare a cathode active material composition. The cathode active material composition is directly coated on an aluminum current collector and dried to form a cathode active film on the current collector, thereby forming a cathode (cathode plate). Alternatively, the cathode active material composition may be cast on a separate support to form a cathode active material film, which is then separated from the support and laminated on an aluminum current collector to prepare a current collector with the cathode active material film, thereby forming a cathode (cathode plate).

Non-limiting examples of the conducting agent include carbon black, graphite particulates, natural graphite, artificial graphite, acetylene black, ketjen black, carbon fibers, metallic materials, such as copper, nickel, aluminum, silver, and the like, in powder, fiber, or tube form, and a conductive polymer such as polyphenylene derivatives. Any suitable conducting agent available in the art may be used.

Non-limiting examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Non-limiting examples of the solvent include N-methyl-pyrrolidone (NMP), acetone, and water. Any suitable material available for these purposes in the art may be used.

In some embodiments, a plasticizer may be further added into the cathode active material composition to form a cathode plate with pores.

Amounts of the composite cathode active material, the conducting agent, the binder, and the solvent are those levels that are generally used in the manufacture of a lithium battery. At least one of the conducting agent, the binder and the solvent may be excluded according to the use and the structure of the lithium battery.

In another embodiment, the cathode may further include a common cathode active material, in addition to the composite cathode active material.

The common cathode active material may be any suitable lithium-containing metal oxides. Here, the suitable common cathode active material should have such a small amount of lithium-containing impurities that it does not result in protrusions on the surface of the cathode active material layer. The common cathode active material may be a lithium composite oxide with a metal selected from cobalt, manganese, nickel, and a combination thereof, for example, a compound represented by one of the following formulae: $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$, and $0.001 \leq b \leq 0.1$); $Li_aMnG_bO_2$ (where $0.90 \leq a \leq 1$, and $0.001 \leq b \leq 0.1$); $Li_aMn_2G_bO_4$ (where $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

Non-limiting examples of the suitable cathode active material are $LiCoO_2$, $LiMn_xO_{2x}$ ($x=1, 2$), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), and $FePO_4$.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using any methods that do not adversely affect the physical properties of the cathode active material when a compound of the coating element is used. For example, the coating layer may be formed using a spray coating method, a dipping method, or the like. Such coating methods are known to those of skill in the art, and thus a detailed description thereof will be omitted.

Figure 1:
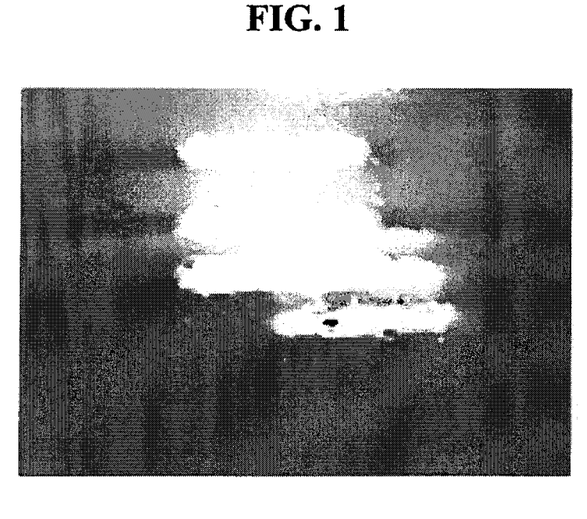
FIG. 1 is a surface image of a cathode manufactured in Example 6.

The cathode may include a current collector, and a cathode active material layer disposed on the current collector, wherein a surface area of the cathode active material layer with protrusions projecting above from the surface of the cathode active material layer is smaller than a surface area of the cathode active material layer without protrusions. That is, protrusions may be formed only in a limited surface area of the cathode active material layer, and almost the entire surface of the cathode active layer may be flat without protrusions. For example, as illustrated in FIG. 1, a surface of the cathode active material layer with protrusions only in a very limited area of the surface may be obtained.

One or more embodiments of the present invention include a lithium battery including the cathode containing the composite cathode active material. The lithium battery may be manufactured in the following manner.

First, a cathode is prepared according to the above-described cathode formation method.

Next, an anode may be manufactured as follows. The anode may be manufactured in the same manner as the cathode, except that an anode active material is used instead of the composite cathode active material. A conducting agent, a binder, and a solvent used to prepare an anode active material composition may be the same as those used in the composite cathode active material composition.

For example, an anode active material, a conducting agent, a binder, and a solvent are mixed to prepare an anode active material composition. The anode active material composition is then directly coated on a copper current collector, thereby manufacturing an anode (anode plate). Alternatively, the anode active material composition may be cast on a separate support, and then an anode active material film separated from the support may be laminated on a copper current collector to prepare an anode (anode plate).

The anode active material may be any suitable anode active materials for a lithium battery available in the art. For example, the anode active material may include, but is not limited to at least one selected from the group consisting of lithium metal, a metal or metal alloy that can form an alloy with lithium, a transition metal oxide, a non-transition metal oxide, and a carbonaceous material.

Examples of the metal or metal alloy that can form an alloy with lithium include Si, Sn, Al, Ge, Pb, Bi, Sb, a Si—Y alloy (where Y is an alkali metal, an alkali earth metal, a Group XIII element or a Group XIV element excluding Si, a transition metal, a rare earth element, or a combination thereof), and a Sn—Y alloy (where Y is an alkali metal, an alkali earth metal, a Group XIII element or a Group XIV element excluding Sn, a transition metal, a rare earth element, or a combination thereof). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

Non-limiting examples of the transition metal oxide are a lithium titanium oxide, a vanadium oxide, and a lithium vanadium oxide.

For example, the non-transition metal oxide may be $SnO_2$ or $SiO_x$ ($0<x<2$).

Non-limiting examples of the carbonaceous material are crystalline carbon, amorphous carbon, and mixtures thereof. Non-limiting examples of the crystalline carbon are graphite, such as natural graphite or artificial graphite that are in amorphous, plate, flake, spherical or fibrous form. Examples of the amorphous carbon include soft carbon (carbon sintered at low temperatures), hard carbon, meso-phase pitch carbides, sintered corks, and the like.

An amount of each of the cathode electrode active material, the conducting agent, the binder, and the solvent may be those levels that are generally used in the manufacture of a lithium battery.

Next, a separator to be disposed between the cathode and the anode is prepared. The separator for the lithium battery may be any separator that is commonly used in lithium batteries. The separator may have low resistance to migration of ions in an electrolyte and may have an excellent electrolyte-retaining ability. Examples of the separator include glass fiber, polyester, TEFLON®, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form a separator which is coated on the electrode. Alternatively, the separator composition may be cast on a support and then dried to form a separator film, which may then be separated from the support and laminated on an electrode to form a separator which is laminated on the electrode.

The polymer resin used to manufacture the separator may be any suitable material that is commonly used as a binder for electrode plates. Non-limiting examples of the polymer resin include a vinylidenefluoride/hexafluoropropylene copolymer, polyvinylidene fluoride (PVDF), polyacrylonitrile, polymethylmethacrylate and a mixture thereof.

Next, an electrolyte is prepared.

For example, the electrolyte may be an organic electrolyte solution. Alternately, the electrolyte may be in a solid phase. Non-limiting examples of the electrolyte include lithium oxide and lithium oxynitride. Any suitable material used in the art as a solid electrolyte may be used. The solid electrolyte may be formed on the anode by, for example, sputtering.

In some embodiments, the organic electrolyte solution may be prepared as follows. The organic electrolyte solution may be prepared by dissolving a lithium salt in an organic solvent.

The organic solvent may be any suitable organic solvent used in the art. Non-limiting examples of the organic solvent include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any suitable material used as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are non-zero natural numbers), $LiCl$, $LiI$, or a mixture thereof.

Figure 3:
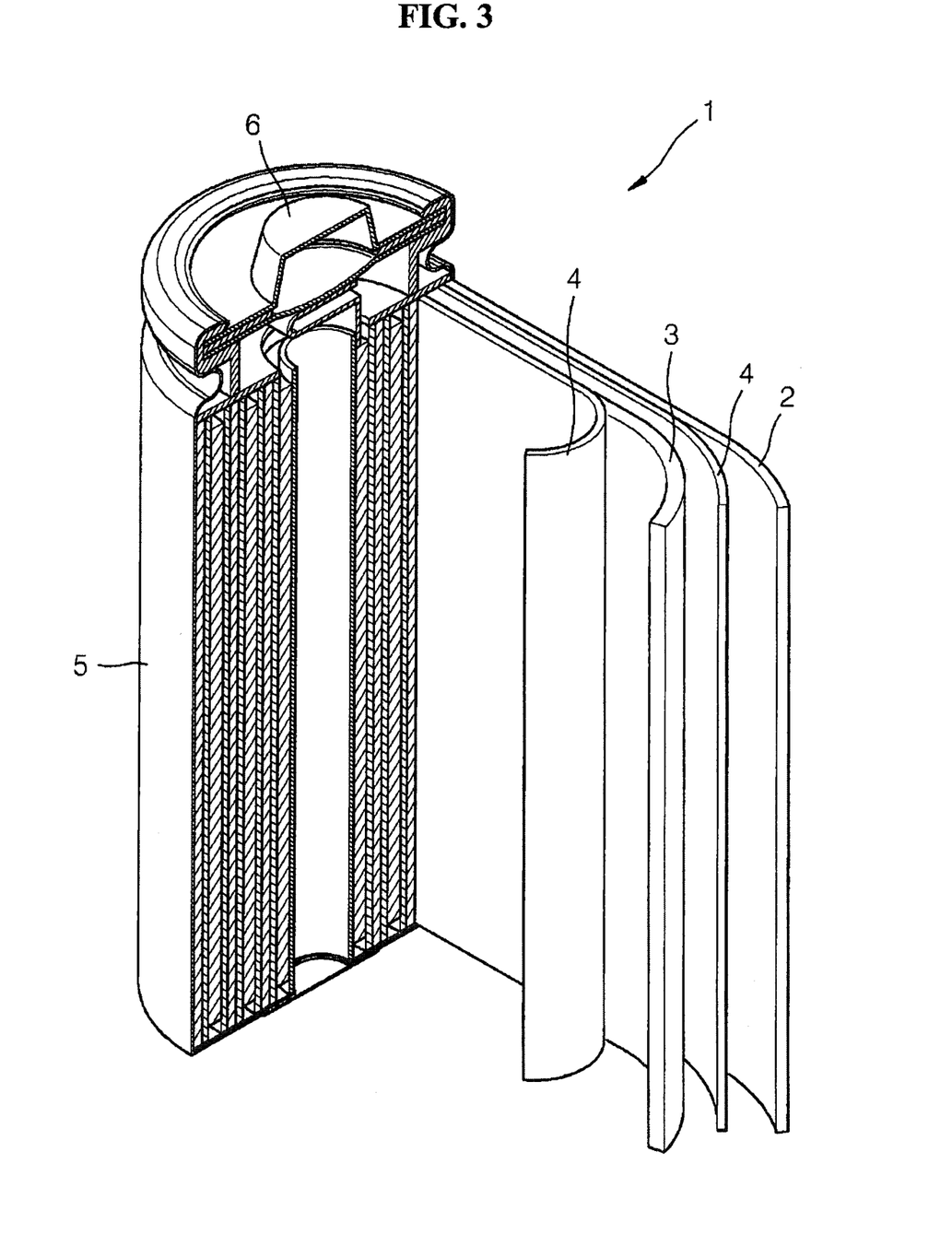
FIG. 3 is a schematic view of a lithium battery according to an embodiment of the present invention.

Referring to FIG. 3, a lithium battery 1 includes a cathode 3, an anode 2, and a separator 4. The cathode 3, the anode 2 and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical case, a rectangular case, or a thin-film case. For example, the lithium battery may be a thin-film battery. The lithium battery may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, electric vehicle, or the like.

The lithium battery may have improved lifetime (lifespan) characteristics and high rate characteristics, and thus may be applicable in an electric vehicle (EV), for example, in a hybrid vehicle such as plug-in hybrid electric vehicle (PHEV). The lithium battery may also be applicable to the high-power storage field, for example, in an electric bicycle, a power tool, and the like.

In one embodiment of the present invention, a method of preparing a composite cathode active material includes: mixing precursors of a lithium transition metal oxide together to prepare a mixture and calcining the mixture in an oxygen atmosphere at a temperature of about 950° C. or higher to obtain a calcined product.

The precursors of the lithium transition metal oxide may include a lithium precursor and a transition metal precursor. Examples of the lithium precursor and the transition metal precursor are any of a variety of materials that are used in the art.

In the method of preparing the composite cathode active material, the oxygen atmosphere may have a high oxygen content, for example, about 99 vol. % of oxygen. When the method is performed in a low oxygen content atmosphere, an increased amount of lithium-containing impurities may remain after the calcining, so that more protrusions may be on the surface of the cathode active material layer.

The calcining may be performed at a temperature of about 950° C. or higher. When the calcination temperature is too low, an increased amount of lithium-containing impurities may remain after the calcining, so that more protrusions may be on the surface of the cathode active material layer.

In some embodiments, the calcining may be performed at a temperature of about 950° C. or greater for about 5 hours. When the calcination time is too short, an increased amount of lithium-containing impurities may remain after the calcining, so that more protrusions may be on the surface of the cathode active material layer. The calcination time may have no upper limit. However, if the calcination time is too long, the manufacturing costs may be increased. For example, the calcination time may be from about 5 hours to about 100 hours.

In the method of preparing the composite cathode active material, a mole ratio (Li/Me) of lithium metal (Li) to metals other than Li (Me), may be about 1.05 or less (i.e. Li/Me may be about 1.05 or less). In some embodiments, the mole ratio of Li/Me may be from about 0.99 to about 1.05. When the mole ratio of Li/Me is too low, a yield of the composite cathode active material may be reduced. When the ratio of Li/Me is too high, an increased amount of lithium-containing impurities may remain after the calcining, so that more protrusions may be on the surface of the cathode active material layer.

The method of preparing the composite cathode active material may further include cooling the calcined product to room temperature. The cooling may be performed in an oxygen atmosphere. When the cooling condition is performed in a non-oxygen atmosphere, an increased amount of lithium-containing impurities may remain, so that more protrusions may be on the surface of the cathode active material layer.

In some embodiments, the cooling of the calcined product may be performed from about 950° C. or higher to about room temperature, for example, to about 25° C. for about 5 hours or longer. For example, the cooling time may be from about 5 hours to about 20 hours. When the cooling time is too short, an increased amount of lithium-containing impurities may remain after the calcining, so that more protrusions may be on the surface of the cathode active material layer.

In the method of preparing the composite cathode active material, the time it takes to increase the temperature of the mixture from room temperature to about 950° C. or higher may be about 5 hours or longer, and in some embodiments, may be from about 5 hour to about 20 hours.

One or more embodiments of the present invention will now be described in more detail with reference to the following examples. However, these examples are not intended to limit the scope of one or more embodiments of the present invention.

Preparation of Composite Cathode Active Materials

Example 1

Lithium carbonate ($Li_2CO_3$) and nickel cobalt manganese hydroxide (($Ni_{0.5}Co_{0.2}Mn_{0.3}$)(OH)$_2$) as starting materials were mixed together to obtain a precursor mixture. After increasing the temperature from room temperature to about 950° C. for about 5 hours in an oxygen atmosphere (93.0 vol. % or greater), the precursor mixture was calcined at about 950° C. for about 5 hours, and then cooled to room temperature for about 5 hours in an oxygen atmosphere, thereby preparing a composite cathode active material (Li[$Ni_{0.5}Co_{0.2}Mn_{0.3}$]$O_2$). A mole ratio of lithium to metals other than lithium (nickel, cobalt, and manganese) in the precursor mixture was about 0.99.

Example 2

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.00.

Example 3

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.01.

Example 4

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.03.

Example 5

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.05, and the calcination temperature was varied to about 970° C.

Example 6

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.05, and the calcination temperature was varied to about 1100° C.

Comparative Example 1

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.05, and the calcining was performed in an atmospheric condition.

Comparative Example 2

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.05, and the calcination temperature was varied to about 940° C.

Comparative Example 3

A composite cathode active material (Li[$Ni_{0.5}Co_{0.2}Mn_{0.3}$]$O_2$) was prepared in the same manner as in Example 1, except that a mole ratio of lithium to metals other than lithium (nickel, cobalt, and manganese) in the precursor mixture was about 1.06.

Manufacture of Cathode and Lithium Battery

Example 7

The composite cathode active material prepared in Example 1 and a carbonaceous conducting agent (Super-P; Timcal Ltd.) were uniformly mixed in a weight ratio of 90:5, and then a solution of polyvinylidene fluoride (PVDF) dissolved in N-methylpyrrolidone (NMP) was added thereto to prepare a slurry containing the composite cathode active material, the carbonaceous conducting agent, and the binder in a weight ratio of 90:5:5.

The cathode active slurry was coated on a 15 μm-thick aluminum foil, followed by drying and further drying in vacuum to manufacture a cathode plate.

A lithium battery in the form of a coin cell (2016 type) of about 16 mm in diameter was manufactured using the cathode.

In manufacturing the lithium battery in the form the coin cell, metal lithium as a counter electrode, a polyethylene separator (Celgard 3501), and an electrolyte solution of 1.3M $LiPF_6$ dissolved in a mixed solvent of ethylenecarbonate (EC) and diethylcarbonate (DEC) in a 3:7 volume ratio were used.

Examples 8-12

Lithium batteries were manufactured in the same manner as in Example 7, except that the composite cathode active materials prepared in Examples 2 to 6 were respectively used.

Comparative Examples 4-6

Lithium batteries were manufactured in the same manner as in Example 7, except that the composite cathode active materials prepared in Comparative Examples 1 to 3 were respectively used.

Evaluation Example 1

Evaluation of Impurities-on-Surface

The composite cathode active material powders of Examples 1 to 6 and Comparative Examples 1 to 3 were dissolved in water, and titrated with hydrochloric acid to calculate LiOH content and $Li_2CO_3$ content in each of the composite cathode active materials powders. These results were used to calculate LiOH content remaining on the surface of the lithium transition metal oxide, free lithium content, and a mole ratio of LiOH to $Li_2CO_3$ ($LiOH/Li_2CO_3$). The results are shown in Table 1 below.

TABLE 1

|  | LiOH content [wt %] | Free lithium content [wt %] | $LiOH/Li_2CO_3$ mole ratio |
| --- | --- | --- | --- |
| Example 1 | 0.032 | 0.0322 | 0.416 |
| Example 2 | 0.047 | 0.0360 | 0.480 |
| Example 3 | 0.062 | 0.0426 | 0.473 |
| Example 4 | 0.069 | 0.0476 | 0.469 |
| Example 5 | 0.061 | 0.0419 | 0.473 |
| Example 6 | 0.033 | 0.0271 | 0.355 |
| Comparative Example 1 | 0.076 | 0.0546 | 0.439 |
| Comparative Example 2 | 0.078 | 0.0431 | 0.716 |
| Comparative Example 3 | 0.078 | 0.0484 | 0.569 |

Referring to Table 1 above, the composite cathode active materials of Examples 1 to 6 are shown to have less LiOH content remaining on the surface of its lithium transition metal oxides, less free lithium content, on average, and a smaller $LiOH/Li_2CO_3$ mole ratio, on average, as compared with the composite cathode active materials of Comparative Examples 1 to 3.

For the impurity content remaining on the surface of the composite cathode active material powder after a lifetime (lifespan) characteristic test (see Evaluation 3 below), which was measured on the composite cathode active material powder extracted from each cell via disassembling the cell, the composite cathode active materials of Examples 1 to 6 are also shown to have less LiOH content remaining on the surface of its lithium transition metal oxides, less free lithium content, and a smaller $LiOH/Li_2CO_3$ mole ratio as compared with the composite cathode active materials of Comparative Examples 1 to 3.

Evaluation Example 2

Surface State Evaluation 3000 g of the composite cathode active material powders of each of Examples 1 to 6 and Comparative Examples 1 to 3 was prepared.

62.5 g of a carbon conducting agent (Super-P, Timcal Ltd.), 62.5 g of polyvinylidene fluoride (PVDF) binder, and N-methylpyrrolidone (NMP) were mixed together to prepare 1300 g of a binder solution.

3000 g of the composite cathode active material and 650 g of the binder solution were put into a 5 L-Platenery Mixer, and then stirred at about 15 rpm for about 30 minutes to prepare a first slurry.

350 g of the binder solution was added to the first slurry and mixed at about 30 rpm for about 40 minutes to prepare a second slurry.

300 g of the binder solution was added to the second slurry and mixed at about 45 rpm for about 50 minutes to prepare a third slurry.

80 g of NMP was added to the third slurry and mixed at about 30 rpm for about 10 minutes, followed by degassing in vacuum to prepare a fourth slurry, which was then used in a simplified electrode plate test with a blade having a gap of 200 μm to determine whether protrusions were formed on a cathode plate (first test).

In particular, about 20 g of the fourth slurry was put on an aluminum foil having a size of 20 cm×30 cm, and then spread about 20 cm in a horizontal direction using the blade having a gap of about 200 μm at about 1 cm/sec. Afterward, the surface of the cathode plate was observed to find whether protrusions were formed on the cathode plate.

The fourth slurry was stirred further at about 15 rpm for about 16 hours, and subjected further to the simplified electrode plate test using a blade having a gap of about 20 μm to determine whether protrusions were formed on the cathode plate (second test).

125 g of NMP was added to the fourth slurry, stirred at about 15 rpm for about 5 hours, and subjected further to the simplified electrode plate test using a blade having a gap of about 20 μm to determine whether protrusions were formed on the cathode plate (third test).

Figure 2:
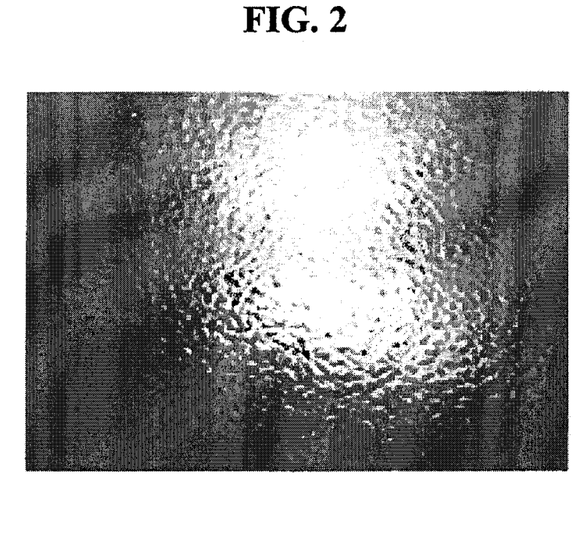
FIG. 2 is a surface image of a cathode manufactured in Comparative Example 2.

FIGS. 1 and 2 are images illustrating some of the surface states of the cathode plates after the first, second, and third electrode plate tests for identifying whether protrusions were formed.

A surface state with no protrusion after completion of all of the first, second, and third electrode plate tests is represented as o, and a surface state with protrusions after at least one of the first, second, and third electrode plate tests is represented as x. The results are shown in Table 2 below.

TABLE 2

|  | Surface state |
|---|---|
| Example 1 | o |
| Example 2 | o |
| Example 3 | o |
| Example 4 | o |
| Example 5 | o |
| Example 6 | o |
| Comparative Example 1 | x |
| Comparative Example 2 | x |
| Comparative Example 3 | x |

Referring to Table 2 above, the composite cathode active material powders of Examples 1 to 6 are found to have markedly improved surface states as compared with the composite cathode active materials of Comparative Examples 1 to 3.

As examples, surface images of the cathodes manufactured using the composite cathode active material powders of Example 6 and Comparative Example 2 at the third test for protrusion identification are shown in FIGS. 1 and 2, respectively.

Referring to FIG. 1, the cathode active material layer formed using the composite cathode active material of Example 6 is found not to have protrusions on a surface thereof, while the cathode active material layer formed using the composite cathode active material of Comparative Example 2 is found to have protrusions over almost the entire surface thereof.

Evaluation Example 3

Evaluation of Lifetime Characteristics

The coin cells of Examples 7-12 and Comparative Examples 4 to 6 were each charged with a constant current of 0.1 C rate at about 25° C. until the voltage of the cell reached about 4.3V (with respect to Li), and then at a constant voltage of about 4.31V until the current reached 0.01 C, followed by discharging with a constant current of 0.1 C until the voltage reached about 3.0V (with respect to Li).

Subsequently, each of the cells was charged with a constant current of 0.2 C rate until the voltage of the cell reached about 4.3V (with respect to Li), and then with a constant voltage of about 4.31V until the current reached 0.01 C, followed by discharging with a constant current of 0.2 C until the voltage reached about 3.0V (with respect to Li).

Subsequently, each of the cells was charged with a constant current of 0.5 C rate until the voltage of the cell reached about 4.3V (with respect to Li), and then with a constant voltage of about 4.3V until the current reached 0.01 C, followed by discharging with a constant current of 0.5 C until the voltage reached about 3.0V (with respect to Li) (formation process).

Subsequently, each of the lithium cells through the formation process was charged with a constant current of 1.0 C rate at about 25° C. until the voltage of the cell reached about 4.3V (with respect to lithium), and then with a constant voltage of about 4.3V until the current reached 0.01 C, followed by discharging with a constant current of about 1.0 C until the voltage reached about 3.0V (with respect to lithium). This cycle of charging and discharging was repeated 100 times. The capacity retention rate was calculated according to Equation 1 below.

Capacity retention rate[%]=[Discharge capacity at 30th cycle/Discharge capacity at 1st cycle]×100   Equation 1

According to the results of the charging/discharging test, the lithium batteries of Examples 7 to 12 had improved capacity retention rates as compared with the lithium batteries of Comparative Examples 4 to 6.

As described above, according to the one or more of the above embodiments of the present invention, using a composite cathode active material with a low remnant impurity content, a cathode plate manufactured using the same may have reduced protrusions, and a lithium battery including the cathode may have improved cycle characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A composite cathode active material comprising:
a lithium transition metal oxide; and
a lithium-containing impurity on a surface of the lithium transition metal oxide,
wherein:
the lithium-containing impurity comprises free lithium in an amount of about 0.050 wt % or less based on a total weight of the composite cathode active material, and
the lithium-containing impurity comprises LiOH and $Li_2CO_3$, and a mole ratio of LiOH to $Li_2CO_3$ is about 0.50 or less.

2. The composite cathode active material of claim 1, wherein the lithium-containing impurity comprises the free lithium in an amount of about 0.045 wt % or less based on the total weight of the composite cathode active material.

3. The composite cathode active material of claim 1, wherein the mole ratio of LiOH to $Li_2CO_3$ is about 0.480 or less.

4. The composite cathode active material of claim 1, wherein an amount of LiOH is about 0.07 wt % or less based on the total weight of the composite cathode active material.

5. The composite cathode active material of claim 1, wherein an amount of LiOH is about 0.065 wt % or less based on the total weight of the composite cathode active material.

6. The composite cathode active material of claim 1, wherein the lithium transition metal oxide comprises at least one compound represented by Formulae 1 to 5 below:

$Li_xCo_{1-y}M_yO_{2-\alpha}X_\alpha$   <Formula 1>

$Li_xCO_{1-y-z}Ni_yM_zO_{2-\alpha}X_\alpha$   <Formula 2>

$Li_xMn_{2-y}M_yO_{4-\alpha}X_\alpha$ <Formula 3>

$Li_xCo_{2-y}M_yO_{4-\alpha}X_\alpha$ <Formula 4>

$Li_xMe_yM_zPO_{4\alpha}X_\alpha$ <Formula 5> wherein, in Formulae 1 to 5, $0.90 \leq x \leq 1.1$, $0 \leq y \leq 0.99$, $0 \leq z \leq 0.5$, $1-y-z>0$, and $0 \leq \alpha \leq 2$;

Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B);

M is at least one element selected from the group consisting of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), nickel (Ni), manganese (Mn), chromium (Cr), iron (Fe), vanadium (V), and a rare earth element; and X is an element selected from the group consisting of oxygen (O), fluorine (F), sulfur (S), and phosphorous (P).

7. The composite cathode active material of claim 6, wherein $0.4 \leq y \leq 0.99$.

8. The composite cathode active material of claim 1, wherein the lithium transition metal oxide comprises a compound represented by Formula 6 below:

$Li[Li_xMe_y]O_{2+d}$ <Formula 6> wherein, in Formula 6 above, $x+y=1$, $0 \leq x<1$, and $0 \leq d \leq 0.1$, and Me is at least one metal selected form the group consisting of manganese (Mn), vanadium (V), chromium (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

9. The composite cathode active material of claim 1, wherein the lithium transition metal oxide comprises a compound represented by Formula 7 below:

$Li[Li_xNi_aCo_bMn_c]O_{2+d}$ <Formula 7> wherein, in Formula 7, $x+a+b+c=1$; $0 \leq x<1$, $0.4 \leq a<1$, $0<b<1$, $0<c<1$; and $0 \leq d \leq 0.1$.

10. The composite cathode active material of claim 1, wherein the lithium transition metal oxide comprises a compound represented by Formula 8 below:

$(p)Li_2MO_3\text{-}(1-p)LiMeO_2$ <Formula 8> wherein, in Formula 8, $0<p<1$;

M is at least one metal selected from the group consisting of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), nickel (Ni), manganese (Mn), chromium (Cr), iron (Fe), vanadium (V), and a rare earth element; and Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B).

11. The composite cathode active material of claim 1, wherein the lithium transition metal oxide comprises a compound represented by Formula 9 below:

$pLi_2MnO_3\text{-}(1-p)LiNi_aCo_bMn_cO_2$ <Formula 9> wherein, in Formula 9, $0<p<1$, $0<a<1$, $0<b<1$, $0<c<1$, and $a+b+c=1$.

12. A cathode comprising the composite cathode active material of claim 1.

13. The cathode of claim 12, wherein the cathode comprises a current collector and a cathode active material layer on the current collector, and a surface area of the cathode active material layer with protrusions is smaller than a surface area of the cathode active material layer without protrusions.

14. A lithium battery comprising the cathode of claim 13.

15. A method of preparing a composite cathode active material, the method comprising:

mixing precursors of a lithium transition metal oxide together to prepare a mixture; and calcining the mixture in an oxygen atmosphere at a temperature of about 950° C. or higher to obtain a calcined product; and preparing the composite cathode active material from the calcined product, the prepared composite cathode active material comprising a lithium-containing impurity, the lithium-containing impurity comprising free lithium in an amount of about 0.050 wt % or less based on a total weight of the composite cathode active material, and the lithium-containing impurity comprising LiOH and $Li_2CO_3$ and a mole ratio of LiOH to $Li_2CO_3$ is about 0.50 or less.

16. The method of claim 15, wherein the calcining is performed for about 5 hours or longer.

17. The method of claim 15, wherein a mole ratio of Li to metals other than lithium (Me) in the mixture is about 1.05 or less.

18. The method of claim 15, further comprising cooling the calcined product to room temperature.

19. The method of claim 18, wherein the cooling is performed in an oxygen atmosphere.

20. The method of claim 18, wherein the cooling of the calcined product from about 950° C. or higher to room temperature is performed for about 5 hours or longer.

* * * * *